March 3, 1959  V. L. RUGEN  2,875,873
CLUTCH
Filed March 21, 1957  2 Sheets-Sheet 2
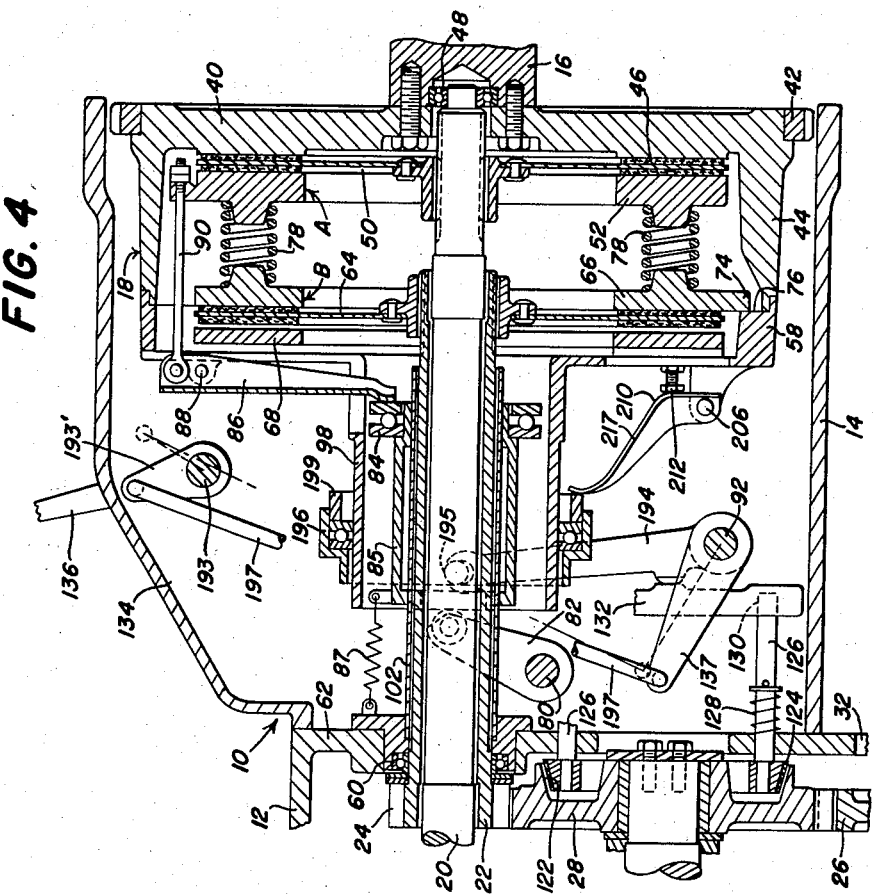
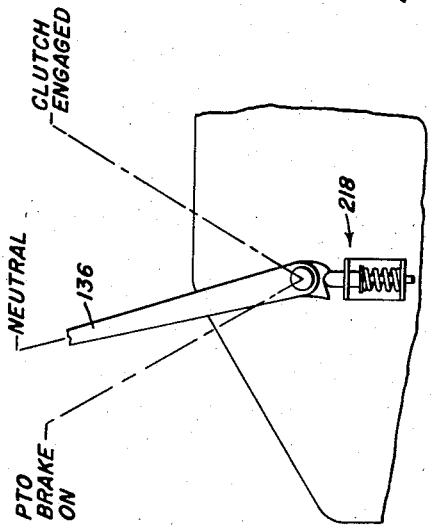
INVENTOR.
V. L. RUGEN

United States Patent Office 2,875,873
Patented Mar. 3, 1959

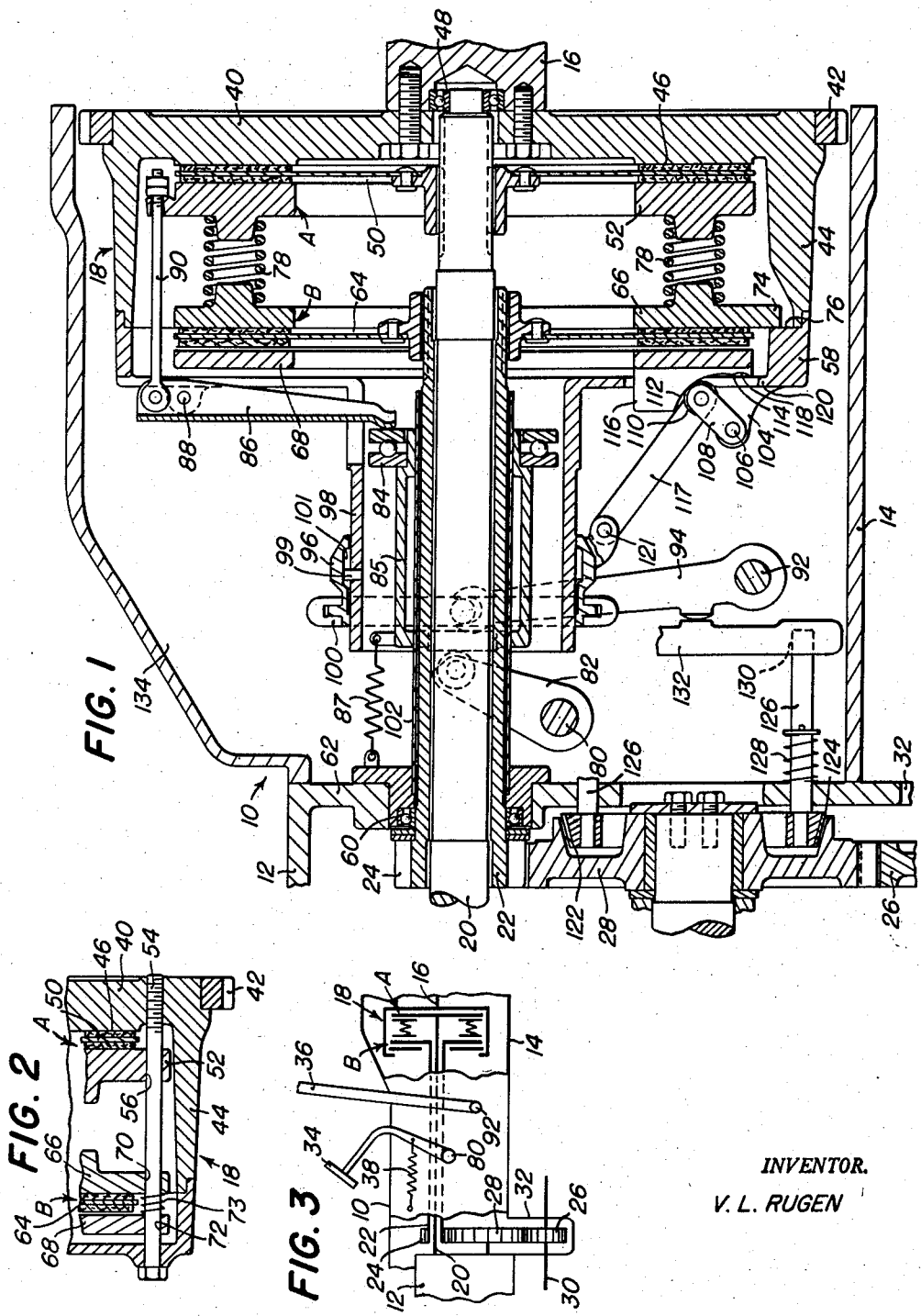

2,875,873
CLUTCH

Vernon L. Rugen, Cedar Falls, Iowa, assignor, by mesne assignments, to Deere & Company, a corporation of Delaware Application March 21, 1957, Serial No. 647,695

12 Claims. (Cl. 192—18)

This application is a continuation-in-part of copending application Ser. No. 436,326, filed June 14, 1954, now abandoned, and the invention relates to a clutch and more particularly to a dual clutch of the type useful broadly in conjunction with vehicle transmissions for producing uni-directional multi-speed drive, bi-directional uni-speed drive or selective and independent drive for different mechanisms, a familiar example of the third-named use of such dual clutch being the farm tractor or vehicle in which one clutch connects the engine to the tractor transmission and the other clutch connects the engine to the tractor power take-off. The advantage of a clutch of this type is that one clutch can be disconnected without affecting the other, and vice-versa.

Although clutches of the general character referred to are well known, prior art designs leave much to be desired in the way of simplicity, economy of manufacture, and convenience in maintenance. Defects of the general nature noted flow primarily from the designer's attempt to compromise apparently conflicting characteristics of independently operated clutches, which are magnified to some extent by the desire to avoid merely a duplication of two separate clutches. Fundamentally, the design problem involves the connection of two shafts to a crankshaft or other constant power source in such manner that the shafts may be operated simultaneously or independently of each other. A conventional dual clutch usable in a situation of this character normally superimposes one clutch on the other, which materially reduces the size of the clutch and flywheel housing ahead of the transmission. According to the present invention, desirable compactness is achieved by the utilization of common biasing or spring-loading means between the pressure plates of the two clutches. However, the invention features the avoidance of undue thrust loads on the throw-out mechanisms, because one of the pressure plates is provided with abutment means beyond which it cannot move so that the biasing means reacts against the abutted pressure plate and acts against the other pressure plate to maintain one of the clutches in engagement except when disengaged by a pedal or the like. In a preferred embodiment of the invention the clutch that is biased into engagement will be controlled by a pedal and will in turn drive the vehicle transmission, while the clutch that incorporates the abutted or stopped pressure plate will be used for driving the power take-off shaft and this clutch will be controlled by a lever having two positive positions as distinguished from the pedal which is normally biased to a position clear of its throw-out bearing.

Another feature of the invention is a positive locking device for positively locking the power take-off clutch in engaged position, in which position the abutted pressure plate thereof is unseated from its abutment or stop so that the spring-loaded biasing means between the pressure plates are used to cushion the power take-off clutch.

A further object of the invention resides in a novel brake construction controlled by the power take-off clutch control so that the power take-off power train is braked when the power take-off clutch is disengaged, which is a desirable feature for stopping not only the power take-off shaft but mechanisms driven therefrom.

The foregoing and other important objects and desirable features inherent in and encompassed by the invention will become apparent from the following detailed disclosure of preferred embodiments of the invention, having reference to the accompanying sheets of drawings, in which the invention is illustrated in several figures to be described immediately below.

Fig. 1 is a longitudinal sectional view through the dual clutch and its relationship to an enclosing housing.

Fig. 2 is a fragmentary sectional view taken at a different angular location in the clutch and illustrating the manner in which the several components of the clutch are mounted.

Fig. 3 is a view, on a reduced scale, illustrating schematically the orientation of the clutch and driving mechanism in a tractor.

Fig. 4 is a sectional view like Fig. 1 but showing a modified type of control for one clutch.

Fig. 5 is a fragmentary elevation further illustrating the control for the one clutch.

It should be borne in mind that the disclosure here is only representative and not limiting. In the interests of convenience and clarity, the expressions "fore-and-aft," "front and rear," etc. have been used, but it will be obvious that the parts can have other relationships in a directional sense.

In Fig. 3 (see also Fig. 1), the numeral 10 designates an intermediate portion of a tractor or vehicle body that includes a rear transmission casing 12 and a forward flywheel and clutch casing 14. The numeral 16 designates the rear end of the crankshaft of an internal combustion engine (not shown) or any other suitable power source and a power train is established through a rotary dual clutch, comprising first and second or front and rear clutches A and B contained in a rotary structure or housing 18, and through a fore-and-aft extending transmission shaft 20 that is journaled and contained within a hollow power shaft 22. The transmission shaft 20 enters the transmission casing 12 and is connected in any suitable manner to change-speed gearing (not shown) contained in the casing. The hollow power shaft 22 has at its rear end a pinion 24 that drives a power take-off shaft gear 26 through the medium of a power take-off idler 28. The power take-off shaft gear 26 is keyed to a power take-off shaft 30 that projects both forwardly and rearwardly from a depending housing portion 32 that may be formed as an integral part of or connected to the vehicle or tractor body 10. The front or transmission clutch A is controlled by a clutch pedal 34; and the power take-off or rear clutch B is controlled by a power take-off lever 36. The pedal 34 is normally maintained in its Fig. 3 position by a spring 38, in which position the transmission or front clutch A will be engaged to furnish power through the shaft 20 to the transmission gearing in the casing 12. The power take-off shaft control lever 36 has a normal position in which the power take-off clutch B is disengaged, an active position in which the clutch B is engaged, and a rear or braking position in which the power take-off shaft brake (to be subsequently described) is operated in series with disengagement of the clutch B.

The rotary clutch housing structure 18 has a front radial wall 40 which is in effect a major portion of the engine flywheel, having its periphery surrounded by a starter ring gear 42. The housing structure 18 further includes an annular peripheral wall 44 that extends rearwardly from the front wall 40. The rear face of the front wall provides an annular radial friction surface 46 which constitutes a first or front driving member.

The forward end of the transmission input shaft 20 is piloted at 48 in the rear end of the engine crankshaft 16 and the two shafts are coaxial, as is the power take-off input shaft 22. Keyed to the forward portion of the transmission input shaft 20 is a first or front friction member or disk 50, which is therefore coaxially behind the driving member or surface 46. Coaxially behind the friction disk 50 is a first or front pressure member in the form of a ring or plate 52, and this pressure plate is connected to the driving member 46 for rotation in unison therewith by means of a plurality of elongated fore-and-aft extending supports in the form of cap screws, only one of which is shown at 54 in Fig. 2, it being understood that there are a plurality of these screws in angularly spaced relationship about the housing structure 18. The pressure plate 52 is apertured, as at 56, at several angularly spaced points corresponding with the angular spacing of the cap screws 54 so that the pressure plate is slidable fore-and-aft on the cap screws, being thereby movable forwardly to incur engagement of the driven member or friction disk 50 between the members 52 and 46 or movable rearwardly to incur disengagement between the members. The housing 18 carries at its rear an annular or ring-like part 58, which is secured to the housing proper by means of the cap screws 54, which screws serve other purposes as will presently appear.

The power take-off hollow input shaft 22 is journaled adjacent its rear end in a bearing 60 in a forward wall portion 62 of the transmission casing 12 and extends forwardly to a front terminal end short of the front end of the transmission input shaft 20. Splined to the forward end of the power take-off input shaft 22 is a second or rear driven member or friction disk 64, the outer peripheral portion of which is sandwiched between a second or rear pressure plate 66 and a second or rear driving member 68. As will be seen, the parts just described are all coaxial and the friction disks 50 and 64 are journaled relative to each other and relative to the driving members 46 and 68. As already described, the front pressure plate 52 is carried for rotation in unison with the rotary housing structure 18 by means of the cap screws 54. These cap screws serve also to support the rear driving member and pressure member or pressure plate for rotation in unison with the housing 18, the parts 66 and 68 being respectively apertured at 70 and 72 (Fig. 2) to receive the cap screw, it again being understood that there are a plurality of angularly spaced mountings such as that illustrated representatively in Fig. 2.

It is a feature of the invention that the rearward movement of the rear or power take-off clutch pressure plate 66 is limited and for this purpose that pressure plate has one or more peripheral portions, such as shown at 74, engageable with abutment means 76 constituting one or more radially inwardly projecting parts on the annular wall 44 of the housing 18. In particular, the abutment 76 is established by a front portion of the annular ring 58 that is secured to the rear end of the housing 18. It will be understood, of course, that the stopping of the rearward movement of the pressure plate 66 is balanced about the housing 18 by a plurality of abutment or stop means similar to those described at 74—76.

The front and rear pressure plates 52 and 66 are normally urged apart or in opposite front and rear directions by biasing means comprising a plurality of coil compression springs 78. These springs act against the stopped or abutted rear pressure plate 66 and react against the front pressure plate 52 to move the front pressure plate forwardly and thereby to engage the front friction disk 50 between the front pressure plate and the front driving member 46, thus establishing a driving connection between the rotary housing 18 and the transmission input shaft 20. In short, the clutch A is normally held in engagement by the biasing means 78.

Engagement and disengagement of the clutch A is effected by the pedal 34, which pedal is mounted on a transverse rockshaft 80 to which is keyed a throw-out arm 82 interiorly of the clutch and flywheel casing 14. The throw-out arm 82 cooperates with an axially shiftable throw-out bearing 84 which is constrained for axial shifting with a sleeve 85 and which in turn is engageable with the lower or radially innermost end of a control arm 86 having its outer end portion pivoted at 88 to the rear ring part 58 of the rotary housing 18. The sleeve 85 and bearing 84 are biased rearwardly by springs 87 only one of which is shown. A forwardly extending link 90 connects the radially outermost end of the control link 86 to the front pressure plate 52. This mechanism constitutes first actuating means for the clutch A. When the pedal 34 is depressed against the spring 38, the throw-out bearing 84 is moved forwardly under the influence of the arm 82, rocking the control arm 86 in a counterclockwise direction about its pivot 88 to draw rearwardly on the link 90 and thus to move the pressure plate 52 rearwardly away from the friction disk 50, releasing the clamping action of the disk between the pressure member 52 and front driving face or member 46. When pressure on the pedal 34 is released, the springs 78 restore engagement of the clutch A and the spring 38 restores the pedal 34 to its original position. To the extent described, the operation of the front clutch A is somewhat conventional, but this adds to rather than detracts from the novelty of the arrangement of the clutches A and B, since it is a feature of the invention to utilize proven and well known structure as far as possible and to associate therewith a power take-off clutch such as the clutch B without destroying any of the efficiency of the clutch A. One of the features of this arrangement is the abutment means 74—76 for limiting rearward movement of the rear pressure plate 66 while permitting forward movement of that plate. The plate 68 is normally biased rearwardly or in a direction of separation from the disk 64 by biasing means in the form of coil springs 73 carried respectively by the cap screws 54 and which springs are lighter than the springs 78 but strong enough to eliminate drag on the clutch B. This feature of the invention takes cognizance of the fact that the clutch A is only periodically disengaged for only relatively short instants, whereas disengagement of the power take-off clutch B may occur more frequently but in any event the disengagement of the power take-off clutch will extend over rather prolonged periods, and it is during these periods, as well as during periods of engagement of the power take-off shaft clutch, that the clutch A should operate at maximum efficiency and clutch B should offer no drag.

As previously noted, the power take-off shaft or rear friction disk 64 is interposed or sandwiched between the rear pressure plate 66 and the rear driving member 68. Also, the rear driving member has been described as being capable of movement fore-and-aft relative to the other members of the dual clutch in the housing 18. Forward movement of the rear driving member 68 incurs engagement of the clutch B, while rearward movement incurs disengagement. Engagement and disengagement is controlled by the power take-off clutch lever 36 and internal second actuating means comprising, in cooperation with the springs 73, a transverse rockshaft 92 to the outer end of which the lower end of the lever 36 is keyed. Keyed to the inner end of the rockshaft 92 is an actuating arm 94 having a forked end engageable with an axially shiftable ring 96 slidable on a sleeve 98 secured to the rear ring part 58 of the dual clutch housing 18. A dowel 99 is carried by the sleeve 98 and constrains the ring 96 for rotation with the clutch housing 18, axial movement of the ring 96 being permitted because of the axial space at 101. The ring 96 is encircled by a relatively rotatable actuating band 100. The sleeve 98 encircles the throw-out bearing 84 which is in turn mounted on a smaller sleeve 102 which has its rear end fixed to the front wall portion 62 of the transmission casing 12. Thus, the actuating means 84 and 96 are independent of each other.

The power take-off shaft clutch actuating means includes further a plurality of rearwardly projecting lugs, only one of which is shown at 104 in Fig. 1. There are, of course, a plurality of these lugs spaced angularly about the rear face of the ring 58 but a description of one will suffice. The lug 104 has pivoted thereto at 106 one end of an actuating link 108, the other end of which carries a follower in the form of a roller 110 engageable with low and high portions 112 and 114 on a cam 116 formed or mounted on the rear face of the power take-off shaft clutch driving member 68. The low portion 112 of the cam 116 is formed on an arc about the pivot 106 as a center, and the high portion 114 is closer to the pivot 106 than the length of the radius for the arc of the cam portion 112. The link 108 is connected at its free or roller-mounting end to a force-transmitting link 117 which is in turn pivotally connected at 121 to the actuating ring 96.

Just past the high portion 114 of the cam 116 is a notch 118 into which the roller 110 is received when the link 108 is rocked in a clockwise direction to its clutch-engaging position. A portion 120 just beyond the notch prevents further radial outward movement of the roller 110. When the roller 110 is in the notch 118, it is overcenter as respects the pivot 106, or as respects a fore-and-aft line through the pivot and parallel to the axis of the clutch units. Therefore, an overcenter or locked position is established by the locking device afforded by the mechanism just described.

The front face of the power take-off idler gear 28 includes an internal conical brake surface 122, with which a brake device or ring 124 is selectively engageable. The brake is carried on fore-and-aft slidably mounted rods 126 that are urged to a non-braking position by light coil springs 128. The forward end of each rod 126 is fixed in a socket 130 in a brake-actuating ring 132 (a portion of which is broken away in Fig. 1), which lies just behind the actuating arm 94 for the power take-off shaft clutch B. The arrangement is such that when the arm 94 is rocked in a rearward direction, rearward movement of the brake-actuating ring 132 is accomplished, with the result that the rods 126 are thrust rearwardly so that the brake ring 124 engages the brake surface 122 of the power take-off idler gear 28. The brake is applied when the power take-off shaft control lever 36 is moved rearwardly from its neutral position as shown in Fig. 3. Since the cam surface 112 on the cam 116 of the clutch B is arcuate about the pivot 106, application of the brake does not affect further disengagement of clutch B.

In the operation of a tractor or other vehicle equipped with the construction just described, power from the engine is used to drive the transmission and/or the power take-off shaft simultaneously or independently of each other. In a starting position of the vehicle, clutch A will be engaged and clutch B will be disengaged, as shown in Fig. 1. Clutch A may be disengaged by depression of the pedal 34 for the selection of a proper gear in the transmission casing 12. When the clutch A is reengaged, the vehicle may be driven forwardly or rearwardly. Up to this point, the clutch B remains disengaged. Loading of clutch A is accomplished through the clutch springs 78 which react against the clutch B pressure plate 66 as stopped at 74—76.

While the vehicle is traveling forwardly, for example, clutch B may be engaged by forward movement of the lever 36, which operates through the actuating linkage means 92, 94, 96 and 117 to move the lockable device 108—116 to its overcenter or locked position in which the roller 110 is received by the notch 118 in the cam 116. When the roller moves to its locked or clutch-engaging position, the driving member 68 of clutch B is moved forwardly, pressing against the friction disk 64 which in turn presses against the clutch B pressure plate 66, thus unseating the plate 66 from its abutment or stop at 74—76. Even though an additional load is thereby applied to the clutch springs 78, operation of clutch A is not affected. Moreover, the springs are utilized to cushion clutch B and will enable clutch B to slip when loads in excess of a predetermined maximum are encountered. When the roller 110 is in its locked position, the thrust is taken directly through the link 108 on the lug 104 and no thrust is applied to the actuating linkage including the parts 94—96—117. Consequently, the lever 36 may remain in its forward position. When it is desired to disengage clutch B, the lever is moved rearwardly, the roller 110 passing from the notch 118 to ride on the arcuate low portion 112 of the cam 116. If it is desired to apply the power take-off shaft brake, the lever 36 may be moved additionally rearwardly to operate through the parts 132—126—124 to engage the brake 122.

Clutch B may be engaged or disengaged at any time. If during the operation of the tractor, it is desired to disengage clutch A, this may be done without affecting drive to clutch B, since clutch B is deriving its power from clutch B driving member 68 and clutch B pressure plate 66, which members, as previously outlined, are connected to the unitary clutch housing 18 for rotation in unison therewith.

In the modification shown in Figs. 4 and 5, the clutch details are the same as described above and need not be repeated here. However, in the interests of orientation, reference numerals previously employed are used in these figures, with the exception of those added to identify the different control components.

The throw-out sleeve or ring 96 is replaced by a sleeve 196 which includes a bearing 199 and the actuating means 104 is replaced by a plurality of arms 217 (only one of which is shown) arranged radially as respects the clutch axis and having their inner ends engageable by the bearing 199 upon forward movement thereof and having their outer ends pivoted at 206 to the ring 58. Each arm or lever 217 has a hump 210 engageable with an adjustable stud 212 on the clutch plate 68. From the description thus far it will be seen that forward shifting of the ring-mounted bearing 199 pivots the arms or lever 217 forwardly about their pivots 206, resulting in forward displacement of the plate 68 via 210—212 into engagement with the plate 64, whereupon clutch B is engaged. The result, generally, is the same as that obtained when clutch B is engaged by the actuating means 108—117 etc. (Fig. 1).

Whereas, in Fig. 1, the engaged position of clutch B is retained by the over-center means 110—114—118 at the clutch, this same result is obtained relatively remotely from the clutch in Figs. 4 and 5. For this purpose, the rockshaft 92, in place of the actuating arm or yoke 94, carries a yoke or arm 194 which engages the sleeve or ring 196 at trunnions 195. The housing 10 carries a second rockshaft 193 on which is mounted a control lever 136 which replaces the lever 36 of Fig. 3. The yoke 194 operates the brake arm 132 as before and is operated by the lever 136 via a link 197, an arm 193' on the shaft 193 and an arm 137 on the yoke. The lever 136 is releasably retainable in any one of three positions ("neutral," "brake" and "clutch") by detent means 218 (Fig. 5). In addition to the detent means, the linkage 197, 193' and 137 operates on the overcenter principle when clutch B is engaged (broken lines, Fig. 4) and thus is the equivalent of the overcenter means 114—118 of Fig. 1, with certain differences. For example, when the clutch B is engaged in Figs. 4 and 5, the throw-out bearing 199 is thrust-loaded and remains so until clutch B is disengaged by return of the lever 136 to neutral. Such arrangement has several distinct advantages. First, the bearing is loaded in only one direction and thus enables the use of a smaller and relatively inexpensive bearing.

Second, it permits the location of the overcenter lock relatively remote from the clutch and reduces the force required to shift the lever. The remote location is also valuable in cases in which the design of the clutch imposes space limitations making it difficult to use the overcenter design of Figs. 1–3, which is not to say however that that design is without its own disadvantages, which have been set out hereinbefore.

Various other features of the invention not specifically enumerated herein will undoubtedly occur to those versed in the art, as will minor modifications and alterations in the preferred embodiment of the invention illustrated, all of which may be achieved without departing from the spirit and scope of the invention.

What is claimed is:

1. A dual clutch, comprising: a driving structure rotatable on a fore-and-aft axis; a first clutch including a coaxial driving member driven by the driving structure, a coaxial friction member behind the driving member and journaled relative to the driving structure, and a coaxial pressure member behind the friction member and driven by the driving structure but mounted for axial shifting selectively forwardly and rearwardly to respectively engage and disengage the friction member with and from the driving member; a second clutch including a pressure member coaxially spaced behind the first clutch pressure member and driven by the driving structure but mounted for fore-and-aft shifting, a friction member coaxially behind the second clutch pressure member and journaled relative to the driving structure, and a driving member coaxially behind the second clutch friction member and connected to the driving structure for rotation therewith but for axial fore-and-aft shifting relative thereto; abutment means connected to the driving structure and engageable with the second clutch pressure member to afford a limit seat on rearward movement of said second clutch pressure member; biasing means interposed between the pressure members and urging the second clutch pressure member rearwardly against the abutment means and simultaneously urging the first clutch pressure member forwardly to engage the first clutch friction and driving members; first actuating means mounted on the driving structure and connected to the first clutch pressure member for shifting said second clutch pressure member rearwardly to disengage the first clutch; and second actuating means on the driving structure independently of the first actuating means and connected to the second clutch driving member for causing shifting of said second clutch driving member selectively between a disengaged rear position clear of the second clutch friction member while the second clutch pressure member is seated on the abutment means and a forward position pressing said second clutch friction member forwardly against the second clutch pressure member to unseat said second clutch pressure member from said abutment means.

2. The invention defined in claim 1, in which: the second actuating means includes a positive releasable locking device for locking the second clutch driving member in its forward position.

3. The invention defined in claim 1, in which: the second clutch driving member is circular and has a rear radial face portion; the driving structure has a peripheral portion including a part proximate to and radially outwardly of the aforesaid radial portion; said radial portion has a cam surface thereon facing rearwardly and provided with low and high portions, said high portion being adjacent to and spaced radially inwardly of the aforesaid part on the driving structure; and the second actuating means includes a link pivoted to the driving structure on a transverse axis behind the cam surface and radially inwardly of the high portion of the cam surface, and follower means on the link movable forwardly and radially outwardly over the low portion of the cam surface as the link pivots forwardly, said follower passing over the high portion of the cam surface and overcenter as respects the link pivot to be retained against return movement by said high portion and to be retained against further radially outward movement by said part on the driving structure.

4. The invention defined in claim 1, including: a first shaft connected to the first clutch friction member; a second shaft connected to the second clutch friction member; driven mechanism connected to the second shaft and including a rotatable part; brake means selectively engageable with and disengageable from the rotatable part; and force-transmitting means connected between the brake means and the second actuating means and operative to engage the brake means with the rotatable part upon movement of the second actuating means to incur the rear position of the second clutch driving member.

5. A dual clutch, comprising: an annular hollow housing rotatable about a fore-and-aft axis and including a radial front wall and an axially rearwardly extending peripheral wall, said front wall having a rearwardly facing driving surface; a first friction disk coaxially journaled within the housing behind the driving surface; a first pressure plate coaxially disposed within the housing behind the friction disk and driven by the housing but shiftable fore-and-aft relative to the housing to respectively engage and disengage the friction disk with and from the driving surface; a second pressure plate coaxially within and driven by the housing in rearwardly spaced relation to the first pressure plate and mounted for fore-and-aft shifting, said second pressure plate having a peripheral portion adjacent to the peripheral wall of the housing; abutment means on and projecting radially inwardly from the peripheral wall of the housing and engageable behind the peripheral portion of the second pressure plate to establish a limit on rearward movement of said second pressure plate; a second friction disk coaxially journaled behind the second pressure plate; a rear driving member coaxially behind the second friction disk and driven by the housing but shiftable forwardly to engage the second friction disk with the second pressure plate and rearwardly to disengage said second friction disk from said second pressure plate; biasing means within the housing and interposed between the pressure plates to urge the first pressure plate forwardly and to simultaneously urge the second pressure plate rearwardly and against the abutment means; first actuating means on the housing and connected to the first pressure plate for moving said first pressure plate rearwardly to disengage the first friction disk; and second actuating means mounted on the housing independently of the first actuating means and connected to the rear driving member for causing shifting of said rear driving member rearwardly while the second pressure plate is limited by the abutment means and for shifting said rear driving member forwardly to press the second friction disk forwardly against the second pressure plate and thereby to shift said second pressure plate forwardly from the abutment means and against the biasing means.

6. A dual clutch, comprising: front and rear driving members coaxially spaced apart and interconnected for rotation in unison about a fore-and-aft axis; front and rear coaxially spaced apart driven members journaled on said axis for rotation relative to each other and relative to the driving members and coaxially positioned respectively behind the front driving member and ahead of the rear driving member; means mounting the front and rear driven members for independent fore-and-aft movement respectively into and out of engagement with the front and rear driving members; biasing means interposed between the coaxially spaced apart driven members, including front and rear parts acting respectively on the front and rear driven member and spring means acting on one part and reacting on the other part to urge the front driven member forwardly into engagement with the front driving member and to simultaneously resiliently oppose forward movement of the rear driven member; means connected to the front driven member and engageable with the rear biasing means part to afford a stop limiting rearward movement of said rear part; first actuating means connected to the front driven member for disengaging the front driven member from the front driving member by movement thereof rearwardly against the action of the biasing means; means mounting the rear driving member for fore-and-aft movement respectively into and out of engagement with the rear driven member; and second actuating means independent of the first actuating means and connected to the rear driving member for causing movement of said rear driving member between a forward engaged position pressing forwardly on the rear driven member to disengage the rear part of the biasing means from the aforesaid stop and a rear disengaged position in which the rear driven member is free to rotate between the rear driving member and the stopped rear part of the biasing means.

7. The invention defined in claim 6, in which: the second actuating means includes a support coaxial with the clutch, a throw-out bearing axially shiftable on the support and lever means acted on by the throw-out bearing and acting on the rear driving member.

8. The invention defined in claim 7, including: releasable means acting on the throw-out bearing for releasably locking said bearing in a position incurring the forward engaged position of the rear driving member.

9. The innvention defined in claim 6, including: structure supporting the clutch; control means connected to and for operating the second actuating means and movable on the structure between first and second positions incurring respectively the engaged and disengaged positions of the rear driving member; and means cooperative between the control means and the structure for releasably locking the control means in its first position.

10. The invention defined in claim 9, in which: the second actuating means includes a support coaxial with the clutch, a throw-out bearing axially shiftable on the support and lever means acted on by the throw-out bearing and acting on the rear driving member; and the control means is operative to shift the throw-out bearing fore-and-aft to incur the engaged and disengaged positions of the rear driving member.

11. The invention defined in claim 6, including: means for releasably locking the rear driving member in its forward engaged position.

12. The invention defined in claim 11, in which: said locking means includes an over-center device operative between the front and rear driving members.

References Cited in the file of this patent

UNITED STATES PATENTS

| | | |
|---|---|---|
| 2,237,322 | West | Apr. 8, 1941 |
| 2,371,804 | Cooke | Mar. 20, 1945 |

FOREIGN PATENTS

| | | |
|---|---|---|
| 635,042 | Great Britain | Mar. 29, 1950 |